United States Patent
Muramatsu et al.

(10) Patent No.: US 10,129,479 B2
(45) Date of Patent: Nov. 13, 2018

(54) PHOTOGRAPHING APPARATUS AND PHOTOGRAPHING METHOD WITH OPTICAL LOW-PASS FILTER EFFECT

(71) Applicant: RICOH IMAGING COMPANY, LTD., Tokyo (JP)

(72) Inventors: Koichi Muramatsu, Kanagawa (JP); Koichi Akiyama, Tokyo (JP); Akira Nakano, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 216 days.

(21) Appl. No.: 15/105,971

(22) PCT Filed: Nov. 6, 2014

(86) PCT No.: PCT/JP2014/079399
§ 371 (c)(1),
(2) Date: Jun. 17, 2016

(87) PCT Pub. No.: WO2015/098305
PCT Pub. Date: Jul. 2, 2015

(65) Prior Publication Data
US 2017/0019599 A1    Jan. 19, 2017

(30) Foreign Application Priority Data

Dec. 27, 2013 (JP) ................. 2013-272651
Jan. 28, 2014 (JP) ................. 2014-013085

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23258* (2013.01); *H04N 5/23293* (2013.01); *H04N 5/23245* (2013.01)

(58) Field of Classification Search
CPC ........... H04N 5/23287; H04N 5/23258; H04N 5/23245; H04N 5/2253; H04N 5/2254; H04N 9/045; H04N 9/04; G03B 5/00
See application file for complete search history.

(56) References Cited

U.S. PATENT DOCUMENTS

| 7,750,968 B2 | 7/2010 | Yoshino |
| 2005/0270401 A1* | 12/2005 | Hatano ................ H04N 5/2254 348/335 |

(Continued)

FOREIGN PATENT DOCUMENTS

| JP | 09-128528 | 5/1997 |
| JP | 2003-167123 | 6/2003 |

(Continued)

OTHER PUBLICATIONS

Machine English Translation JP 2007-258909 A (Oct. 4, 2007) (Year: 2007).*

(Continued)

*Primary Examiner* — Nelson D. Hernández Hernández
(74) *Attorney, Agent, or Firm* — Greenblum & Bernstein, P.L.C.

(57) ABSTRACT

In a photographing apparatus, a low-pass selector controller (processor) is configured to perform a plurality of photographing operations including an LPF-ON photographing operation, which obtains an image signal from an image sensor in a state where the image sensor has been LPF driven by the image-shake correction device (driver) and obtains an optical low-pass filter effect, and an LPF-OFF photographing operation, which obtains an image signal from the image sensor in a state where the image sensor has not been LPF driven by the image-shake correction device (driver) and does not obtain an optical low-pass filter effect.

19 Claims, 9 Drawing Sheets

(56) References Cited

U.S. PATENT DOCUMENTS

| | | | |
|---|---|---|---|
| 2006/0038908 A1* | 2/2006 | Yoshino | H04N 1/00458 |
| | | | 348/333.11 |
| 2007/0291154 A1* | 12/2007 | Moon | H04N 5/23248 |
| | | | 348/333.05 |
| 2016/0026068 A1 | 1/2016 | Yamamoto | |
| 2016/0094768 A1 | 1/2016 | Yamamoto | |
| 2016/0094767 A1 | 3/2016 | Yamamoto | |

FOREIGN PATENT DOCUMENTS

| | | | |
|---|---|---|---|
| JP | 2003-346143 | | 12/2003 |
| JP | 2006-060387 | | 3/2006 |
| JP | 2007-258909 | | 10/2007 |
| JP | 2007258909 A | * | 10/2007 |
| JP | 2008-035241 | | 2/2008 |
| JP | 2008035241 A | * | 2/2008 |
| JP | 2008-076691 | | 4/2008 |

OTHER PUBLICATIONS

Search Report issued by PCT patent office in PCT Patent Application No. PCT/JP2014/079399 with a English language translation, dated Dec. 9, 2014.

* cited by examiner

LPF-ON Photographed Image when LPF Operation is "TYPE 1 (Small)"

Switching of Photographed Image to be Enlarged and Displayed on LCD 60

LPF-ON Photographed Image when LPF Operation is "TYPE 2 (Large)"

PHOTOGRAPHING APPARATUS AND PHOTOGRAPHING METHOD WITH OPTICAL LOW-PASS FILTER EFFECT

TECHNICAL FIELD

The present invention relates to a photographing apparatus, a photographing control method and a program having an LPF function, which are capable of obtaining an optical low-pass filter effect by driving a movable member (shake-correction member) in an direction different (e.g., within a plane that is orthogonal to the optical axis) to that of an optical axis of a photographing optical system.

BACKGROUND ART

In a photographing apparatus, such as a camera, etc., which uses an image sensor, if a high-frequency component that is greater than that of the sampling frequency of the image sensor is included in an object image formed through a photographing lens, moire and false color that does not originally exist in the object image can occur, thereby deteriorating the photographed image.

Patent Literature Nos. 1 through 3 each disclose technology in which the occurrence of moire and false color can be prevented by inserting an optical low-pass filter into the optical path of a photographing optical system to thereby attenuate the high-frequency component of the object image that is formed through the photographing lens. However, optical low-pass filters are expensive and also deteriorate the resolution and contrast.

Patent Literature No. 3 discloses a camera which takes a plurality of photographs at different spatial frequency characteristics while changing the spatial frequency characteristics of the optical low-pass filter.

However, in the camera of Patent Literature No. 3, since the optical low-pass filter is constantly inserted into the optical path of the photographing optical system, even if the spatial frequency is set in order to obtain, e.g., a high-resolution photographed image, a reduction in resolution and contrast of the optical low-pass filter itself occurs to some extent, so that a photographed image having a maximally improved resolution and contrast cannot be obtained.

Furthermore, in an actual on-site photographic shoot, even if the photographer is concerned with occurrence of moire and false color and changes the spatial frequency of the optical low-pass filter when carrying out a photographing operation, sometimes no moire or false color occurs. In such a case, the photographer would regret this result thinking, "if moire or false color is not going to occur, I wanted to obtain a photographic image having maximally improved resolution and contrast, without attenuating the high-frequency component of the object image". However, in the camera of Patent Literature No. 3, since the optical low-pass filter is always inserted into the optical path of the photographing optical system, a photographic image having maximally improved resolution and contrast cannot be obtained without attenuating the high-frequency component of the object image.

Furthermore, in recent years, due to cameras becoming highly sophisticated and multi-functionalized, an extremely vast variety of photographers' photographic preferences exist. For example, there is a photographer's photographic preference in which there is a "desire to obtain, with respect to photographic images having similar compositions, a photographed image having maximally improved resolution and contrast while allowing moire and false color to occur, and a photographed image in which the occurrence of moire and false color is prevented while allowing reduction in resolution and contrast to some extent". However, the camera of Patent Literature No. 3 cannot be applied in a versatile manner with respect to such a photographer's photographic preference.

CITATION LIST

Patent Literature

Patent Literature No. 1: Japanese Unexamined Patent Publication No. 2003-167123
Patent Literature No. 2: Japanese Unexamined Patent Publication No. 2008-76691
Patent Literature No. 3: Japanese Unexamined Patent Publication No. 2007-258909

SUMMARY OF THE INVENTION

Technical Problem

The present invention has been devised in view of the above-mentioned problems, and an object of the present invention is to provide a photographing apparatus, a photographing method and a program which can achieve, without the use of an expensive optical low-pass filter, a photographic image having maximally improved resolution and contrast while, at the same time, being able to achieve a photographic image which prevents occurrence of moire and false color, and can be applied in a versatile manner with respect to the photographer's photographic preferences.

Solution to Problem

A photographing apparatus of the present invention is provided, including an image sensor, which converts an object image that is formed by a photographing optical system into electrical image signals; a driver configured to obtain an optical low-pass filter effect, via an object light-bundle being incident on a plurality of pixels of the image sensor, by LPF driving a movable member in a direction that is different from an optical axis of the photographing optical system, wherein the movable member includes at least one of a lens element, constituting part of the photographing optical system, and the image sensor; and a processor configured to perform a plurality of photographing operations including an LPF-ON photographing operation, which obtains an image signal from the image sensor in a state where the movable member has been LPF driven by the driver and obtains an optical low-pass filter effect, and an LPF-OFF photographing operation, which obtains an image signal from the image sensor in a state where the movable member has not been LPF driven by the driver and does not obtain an optical low-pass filter effect.

During the LPF-ON photographing operation, the processor can perform a plurality of photographing operations by LPF driving the movable member by the driver in stages by different driving amounts to thereby obtain optical low-pass filter effects of different amounts in stages.

The processor can first perform the LPF-OFF photographing operation, and thereafter, in the LPF-ON photographing operation, performs a plurality of photographing operations while increasing the optical low-pass filter effect in stages.

In the LPF-ON photographing operation, the processor can first perform a plurality of photographing operations while decreasing the optical low-pass filter effect in stages, and thereafter perform the LPF-OFF photographing operation.

The photographing apparatus of the present invention can further include a magnified-display controller which enlarges and displays part of an LPF-ON photographed image of the LPF-ON photographing operation on a display. When the LPF-ON photographed image is enlarged and displayed on the display, the magnified-display controller forcibly displays the LPF-ON photographed image at a 1:1 ratio.

The photographing apparatus of the present invention can further include a magnified-display controller which enlarges and displays part of an LPF-OFF photographed image of the LPF-OFF photographing operation on a display. When the LPF-OFF photographed image is enlarged and displayed on the display, the magnified-display controller forcibly displays the LPF-OFF photographed image at a 1:1 ratio.

The photographing apparatus of the present invention can further include a magnified-display controller which enlarges and displays part of an LPF-ON photographed image of the LPF-ON photographing operation on a display, and an alerter configured to output a warning when the LPF-ON photographed image is not displayed at a 1:1 ratio in the case where the magnified-display controller has enlarged and displayed the LPF-ON photographed image on the display.

The photographing apparatus of the present invention can further include a magnified-display controller which enlarges and displays part of an LPF-OFF photographed image of the LPF-OFF photographing operation on a display, and an alerter configured to output a warning when the LPF-OFF photographed image is not displayed at a 1:1 ratio in the case where the magnified-display controller has enlarged and displayed the LPF-OFF photographed image on the display.

The photographing apparatus of the present invention can further include a magnified-display controller which enlarges and displays part of an LPF-ON photographed image of the LPF-ON photographing operation or part of an LPF-OFF photographed image of the LPF-OFF photographing operation on a display. When the photographed image of one of the LPF-ON photographed image and the LPF-OFF photographed image that is enlarged and displayed on the display is switched to the other of the LPF-ON photographed image and the LPF-OFF photographed image, the magnified-display controller enlarges and displays a same part corresponding to each of the LPF-ON photographed image and the LPF-OFF photographed image before and after being switched.

The photographing apparatus of the present invention can further include a magnified-display controller which enlarges and displays part of an LPF-ON photographed image of the LPF-ON photographing operation or part of an LPF-OFF photographed image of the LPF-OFF photographing operation on a display. When the LPF-ON photographed image is enlarged and displayed on the display, the magnified-display controller forcibly displays the LPF-ON photographed image at a 1:1 ratio. When the LPF-OFF photographed image is enlarged and displayed on the display, the magnified-display controller enlarges and displays the LPF-OFF photographed image without limiting the LPF-OFF photographed image to be displayed at a 1:1 ratio.

The photographing apparatus of the present invention can further include a magnified-display controller which enlarges and displays part of at least one of an LPF-ON photographed image of the LPF-ON photographing operation and an LPF-OFF photographed image of the LPF-OFF photographing operation on a display. When the at least one of the LPF-ON photographed image and the LPF-OFF photographed image is enlarged and displayed on the display, the magnified-display controller forcibly displays the at least one of the LPF-ON photographed image and the LPF-OFF photographed image at a 1:1 ratio.

The photographing apparatus of the present invention can further include a comparative display controller configured to display an LPF-ON photographed image obtained in the LPF-ON photographing operation and an LPF-OFF photographed image obtained in the LPF-OFF photographing operation on the display to be arranged in a comparable manner.

The driver can be configured to perform image-shake correction by displacing an image position of the object image on the image sensor by performing an image-shake correction drive operation on the movable member in a direction different to that of the optical axis of the photographing optical system as a combined driving operation with that of the LPF driving or as an independent driving operation when the LPF driving is not being performed.

The photographing apparatus can be set to a live view mode or a movie-shooting mode, and wherein the driver is configured to only perform the image-shake correction drive operation on the movable member without performing the LPF driving during a period when the photographing apparatus is set to the live view mode or the movie-shooting mode.

The photographing apparatus can further include a first switch configured to switch ON and OFF a setting of an LPF bracketing mode; and a second switch configured to switch ON and OFF a setting of another photograph mode including at least one of a bulb shooting mode, continuous shooting mode, exposure bracketing mode, multiple exposure shooting mode, mirror-up shooting mode, auto-shooting mode, movie-shooting mode and live view mode. When both of the LPF bracketing mode and the another photographing mode are set ON by the first switch and the second switch, the photographing apparatus prioritizes the LPF bracketing mode that is set by the first switch.

The photographing apparatus can further include a first switch configured to switch ON and OFF a setting of an LPF bracketing mode; and a second switch configured to switch ON and OFF a setting of another photograph mode including at least one of a bulb shooting mode, continuous shooting mode, exposure bracketing mode, multiple exposure shooting mode, mirror-up shooting mode, auto-shooting mode, movie-shooting mode and live view mode. When both of the LPF bracketing mode and the another photographing mode are set ON by the first switch and the second switch, the photographing apparatus prioritizes the another photographing mode that is set by the second switch.

The photographing apparatus can further include a display configured to display that said processor performs a plurality of photographing operations.

When the shutter-release button is depressed once, the processor can perform a plurality of photographing operations including an LPF-ON photographing operation and an LPF-OFF photographing operation, or, the processor performs a plurality of photographing operations including an LPF-ON photographing operation and an LPF-OFF photographing operation only when the shutter-release button is held down.

A photographing method of a photographing apparatus is provided, the photographing apparatus including an image sensor, which converts an object image that is formed by a photographing optical system into electrical pixel signals; and a driver configured to obtain an optical low-pass filter effect, via an object light-bundle being incident on a plurality of pixels of the image sensor, by driving a movable member in a direction that is different from an optical axis of the photographing optical system, wherein the movable member includes at least one of a lens element, constituting part of the photographing optical system, and the image sensor, the photographing method including a step of bracketing by performing a plurality of photographing operations including an LPF-ON photographing operation, which obtains an image signal from the image sensor in a state where the movable member has been LPF driven by the driver and obtains an optical low-pass filter effect, and an LPF-OFF photographing operation, which obtains an image signal from the image sensor in a state where the movable member has not been LPF driven by the driver and does not obtain an optical low-pass filter effect.

A program, to be implemented by a computer, is provided for controlling a photographing apparatus, which includes an image sensor, which converts an object image that is formed by a photographing optical system into electrical pixel signals; and a driver configured to obtain an optical low-pass filter effect, via an object light-bundle being incident on a plurality of pixels of the image sensor, by driving a movable member in a direction that is different from an optical axis of the photographing optical system, wherein the movable member includes at least one of a lens element, constituting part of the photographing optical system, and the image sensor, the program including a function of bracketing by performing a plurality of photographing operations including an LPF-ON photographing operation, which obtains an image signal from the image sensor in a state where the movable member has been LPF driven by the driver and obtains an optical low-pass filter effect, and an LPF-OFF photographing operation, which obtains an image signal from the image sensor in a state where the movable member has not been LPF driven by the driver and does not obtain an optical low-pass filter effect.

Advantageous Effects of the Invention

According to the present invention, a photographing apparatus, a photographing method and a program can be obtained, which can achieve, without the use of an expensive optical low-pass filter, a photographed image having maximally improved resolution and contrast while, at the same time, being able to achieve a photographed image which prevents occurrence of moire and false color, and can be applied in a versatile manner with respect to the photographer's photographic preferences.

EMBODIMENT

An embodiment of the photographing apparatus according to the present invention applied to a digital SLR camera 10 will be hereinafter discussed with reference to FIGS. 1 through 10.

Figure 1:
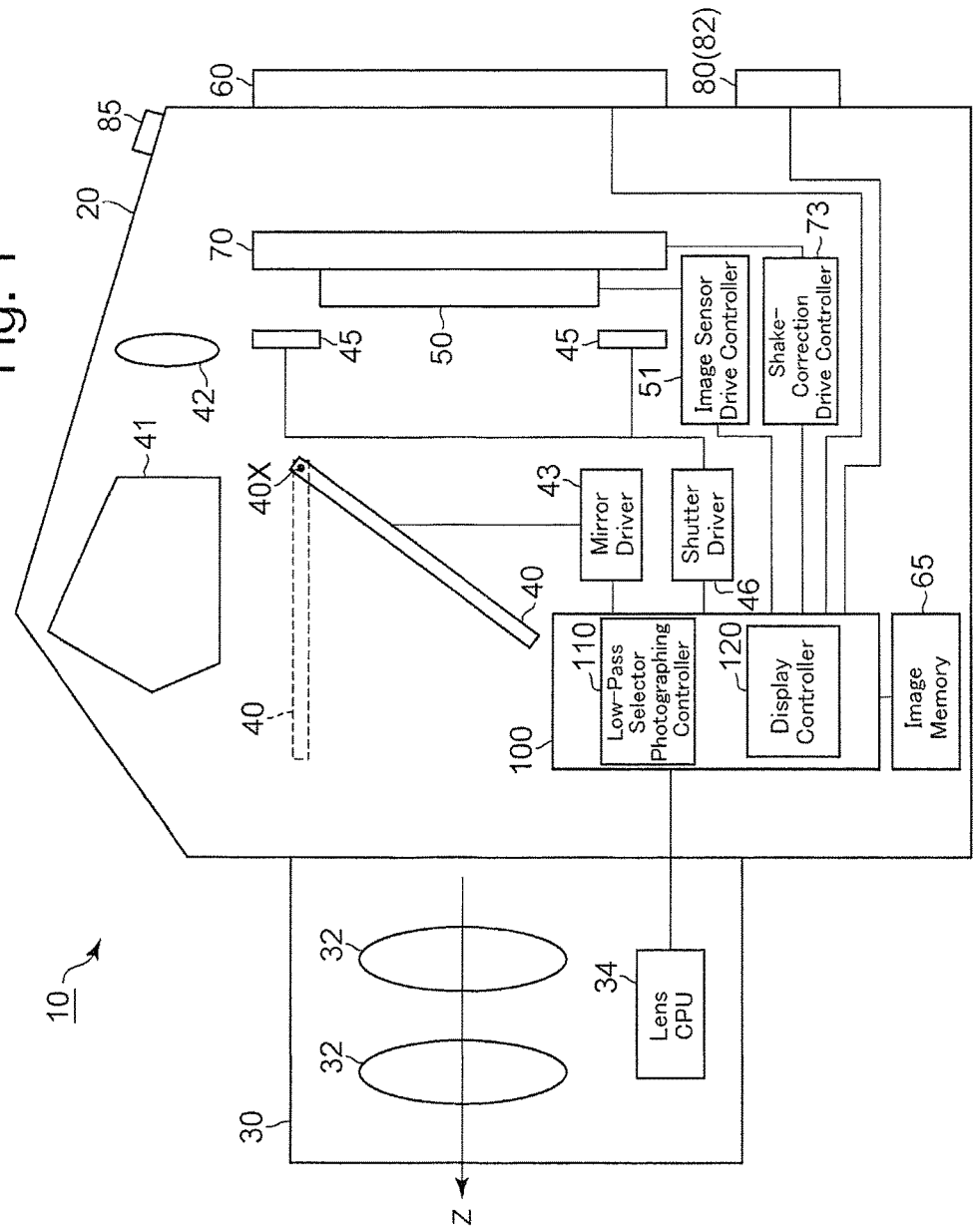
FIG. 1 is a schematic view showing a configuration of a digital SLR camera (photographing apparatus) according to the present invention.

As shown in FIG. 1, the digital camera 10 is provided with a camera body 20, and an interchangeable photographing lens 30 which is detachably attached to the camera body 20.

The interchangeable photographing lens 30 is provided with a photographing lens group (photographing optical system/movable member/image-shake correction member) 32, and a diaphragm (not shown in the drawings), in that order from the object side (left side of FIG. 1) to the image side (right side of FIG. 1). Furthermore, the interchangeable photographing lens 30 is provided with a lens CPU 34 which stores various information such as focusing information and lens-position information of the photographing lens group 32, and aperture information, etc., of the diaphragm (not shown in the drawings). In a state where the interchangeable photographing lens 30 is mounted onto the camera body 20, the various information stored by the lens CPU 34 is read into a camera CPU 100 of the camera body 20 via mount contacts (not shown in the drawings). Note that although FIG. 1 depicts the photographing lens group 32 as two lens elements, in practice the photographing lens group 32 can include three or more lens elements, e.g., a stationary lens element, a zoom lens element that moves during zooming, and a focusing lens element which moves during focusing, etc.

The camera body 20 is provided with a movable mirror (quick-return mirror) 40, a shutter 45, and an image sensor (movable member/image-shake correction member) 50, in that order from the object side (left side of FIG. 1) to the image side (right side of FIG. 1). A pentaprism 41 is provided above the movable mirror 40, and an eyepiece lens element 42 is provided on the exit-surface side of the pentaprism 41.

The movable mirror 40 is configured by a mirror body (not shown in the drawings) being mounted in a mirror-holding frame (not shown in the drawings), and the movable mirror 40 is supported by being pivotally-rotatable about a rotational pivot 40X inside a mirror box (not shown in the drawings). The movable mirror 40 is rotatably drivable about the rotational pivot 40X, between a mirror-down position shown as a solid line in FIG. 1 and a mirror-up position shown as a broken line in FIG. 1, via a mirror driver 43 under the control of the camera CPU 100. When the movable mirror 40 is at the mirror-down position, the object-emanating light incident from the photographing lens group 32 reflects off the movable mirror 40 toward the pentaprism 41. The object-emanating light reflected by the movable mirror 40 is converted into an erected image by the pentaprism 41, and can be viewed from the eyepiece lens element 42. When the movable mirror 40 is at the mirror-up position, the object-emanating light incident from the photographing lens group 32 passes through the shutter 45 and toward the image sensor 50.

The shutter 45 is configured of two shutter curtains: a leading curtain and a trailing curtain. The shutter 45 allows object-emanating light to pass therethrough toward the image sensor 50 via the leading curtain and the trailing curtain being driven by a shutter driver 46 at a predetermined time difference under the control of the camera CPU 100. The exposure time is determined by the predetermined time difference by which the leading curtain and the trailing curtain of the shutter 45 are driven.

The driving of the image sensor 50 is controlled by an image-sensor drive controller 51 under the control of the camera CPU 100. When the movable mirror 40 is at the mirror-up position, the object image that is formed by the object-emanating light that is incident from the photographing lens group 32 and passes through the shutter 45 is formed onto a light-receiving surface of the image sensor 50. The object image that is formed on the light-receiving surface of the image sensor 50 is electrically converted into image signals via a large number of pixels, arranged in a matrix, and is output as image data to the camera CPU 100 via the image-sensor drive controller 51. The camera CPU 100 performs predetermined image processing on the image data that has been input therein from the image sensor 50; and this processed image data is displayed on an LCD (display/alerter) 60 and is stored in an image memory 65. The image memory 65 refers to, e.g., a memory which can output image data to an external device such as a PC, etc., via a USB cable, or to a memory card, such as a flash memory, etc., which is insertable/removable from the digital camera 10 (camera body 20), and does not refer to a temporary storage memory (volatile memory) such as a DRAM, etc., for temporal storage for processing an image received during a live view to be displayed in the LCD 60.

Figure 2:
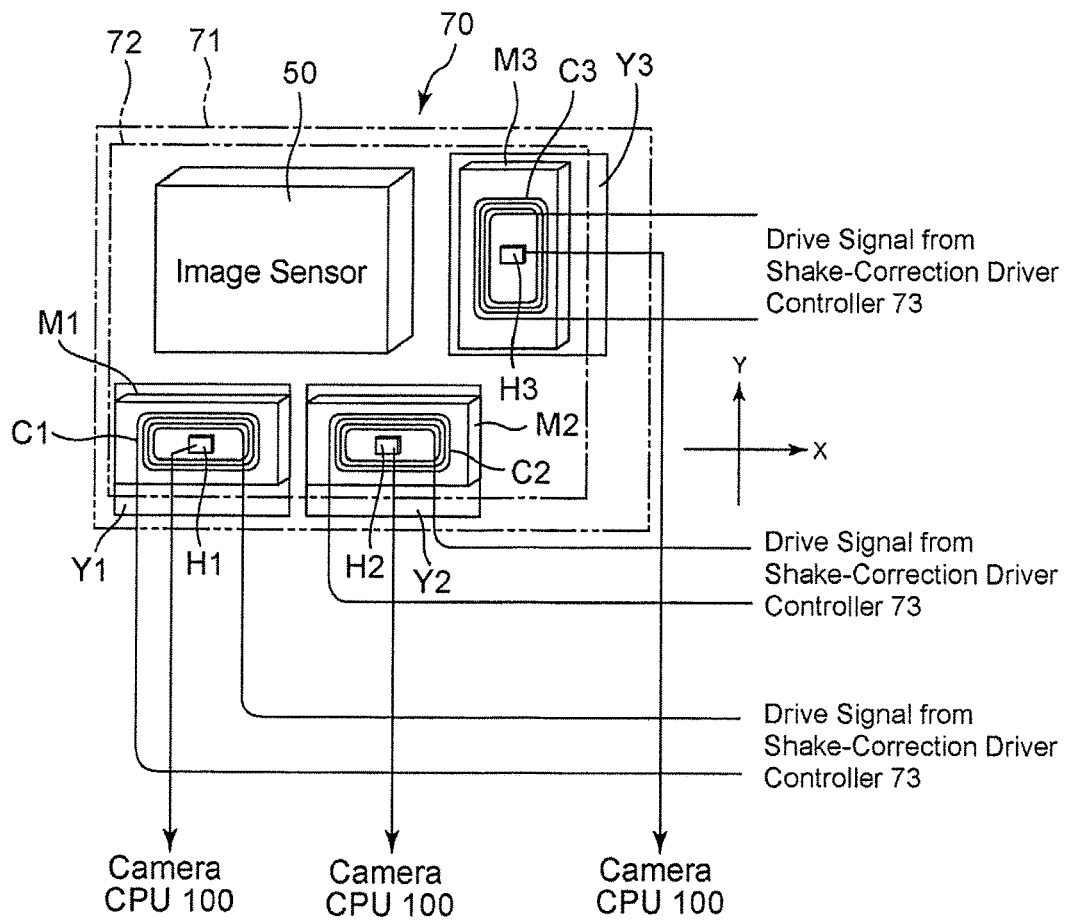
FIG. 2 is a block diagram showing a configuration of an image shake correcting device (driver).
Figure 3:
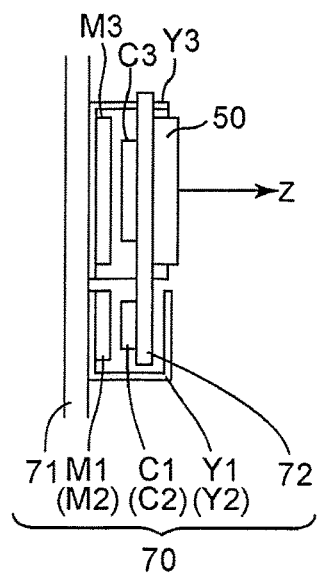
FIG. 3 is a side elevational view showing the configuration of an image shake correcting device (driver).

As shown in FIGS. 1 through 3, the image sensor 50 is mounted onto an image-shake correction device (driver) 70 so that the image sensor 50 is movable in an x-direction and a y-direction (two orthogonal directions), which are orthogonal to an optical axis Z of the photographing optical system. The image-shake correction device 70 is provided with a mount support plate 71 which is mounted onto a structural member such as a chassis, etc., of the camera body 20; a movable stage 72, onto which the image sensor 50 is mounted, which is slidable relative to the mount support plate 71; magnets M1, M2 and M3 mounted onto the mount support plate 71 on the side thereof that faces the movable stage 72; yokes Y1, Y2 and Y3 which are made of a magnetic material and are mounted onto the mount support plate 71 to face the magnets M1, M2 and M3 with the movable stage 72 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 72, which each generate a driving force by receiving an electric current within the magnetic field of the magnetic circuit. The movable stage 72 (image sensor 50) is driven relative to the mount support plate 71 within a plane that is orthogonal to the optical axis by applying alternating drive signals to the drive coils C1, C2 and C3. The alternating drive signals that are applied to the drive coils C1, C2 and C3 are controlled by the camera CPU 100 and are generated by a shake-correction drive controller 73.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 50 at a predetermined distance therebetween; accordingly, the movable stage 72 can be driven in the y-direction. Furthermore, a magnetic driver configured of the magnet M3, the yoke Y3 and the drive coil C3 (one magnetic driver) is arranged along a short-side direction of the image sensor 50 orthogonal to the long-side direction thereof (vertical direction/y-direction); accordingly, the movable stage 72 can be driven in the x-direction.

The mount support plate 71 is further provided with Hall sensors H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and detect position detection signals, which indicate the position of the movable stage 72 (image sensor 50) in the optical-axis orthogonal plane. The y-directional position and inclination (rotation) of the movable stage 72 (image sensor 50) are detected by the Hall sensors H1 and H2, and the x-directional position of the movable stage 72 (image sensor 50) is detected by the Hall sensor H3. The camera CPU 100 controls, via the shake-correction drive controller 73, the driving of the image-shake correction device 70, which moves the image sensor 50 within a plane orthogonal to the optical axis, based on shake detection signals detected by the gyro sensor (not shown in the drawings) that indicate shake/vibrations applied to the camera body 20 in a plane orthogonal to the optical axis, and position-detection signals that indicate the position of the image sensor 50 within a plane orthogonal to the optical axis detected by the Hall sensors H1, H2 and H3. Accordingly, the imaging position of the object image on the image sensor 50 can be displaced to correct image shake that is caused by hand shake/vibrations. In the illustrated embodiment, this operation is referred to as an "image-shake correction operation (image-shake correction drive) of the image-sensor 50".

In the image-shake correction device 70 of the illustrated embodiment, the image sensor 50 is LPF-driven along a predetermined path in a plane that is orthogonal to the optical axis Z of the photographing optical system, to provide an optical low-pass filter effect (hereinafter referred to as a "LPF effect") by making an object light-bundle incident on a plurality of pixels, having different detection colors, of the image sensor 50. In the illustrated embodiment, this operation is referred to as a "low-pass filter operation (LPF driving) of the image sensor 50".

The image-shake correction device 70 of the illustrated embodiment carries out a "central-holding operation (central-holding drive) of the image sensor 50" which holds the image sensor 50 at the central position of the image-shake correction movement-range (image-shake correction driving-range). For example, when the "image-shake correction operation (image-shake correction drive) of the image-sensor 50" and the "low-pass filter operation (LPF drive) of the image sensor 50" are both OFF, a photographing operation is performed with only the "central-holding operation (central-holding drive) of the image sensor 50" turned ON (even if image-shake correction is not carried out).

An embodiment is possible in which the "image-shake correction operation (image-shake correction drive) of the image-sensor 50", the "low-pass filter operation (LPF drive) of the image sensor 50" and the "central-holding operation (central-holding drive) of the image sensor 50" are achieved as a combined operation (combined driving) thereof by the image-shake correction device 70, or in which only one of these operations are achieved by the image-shake correction device 70.

Figure 4:
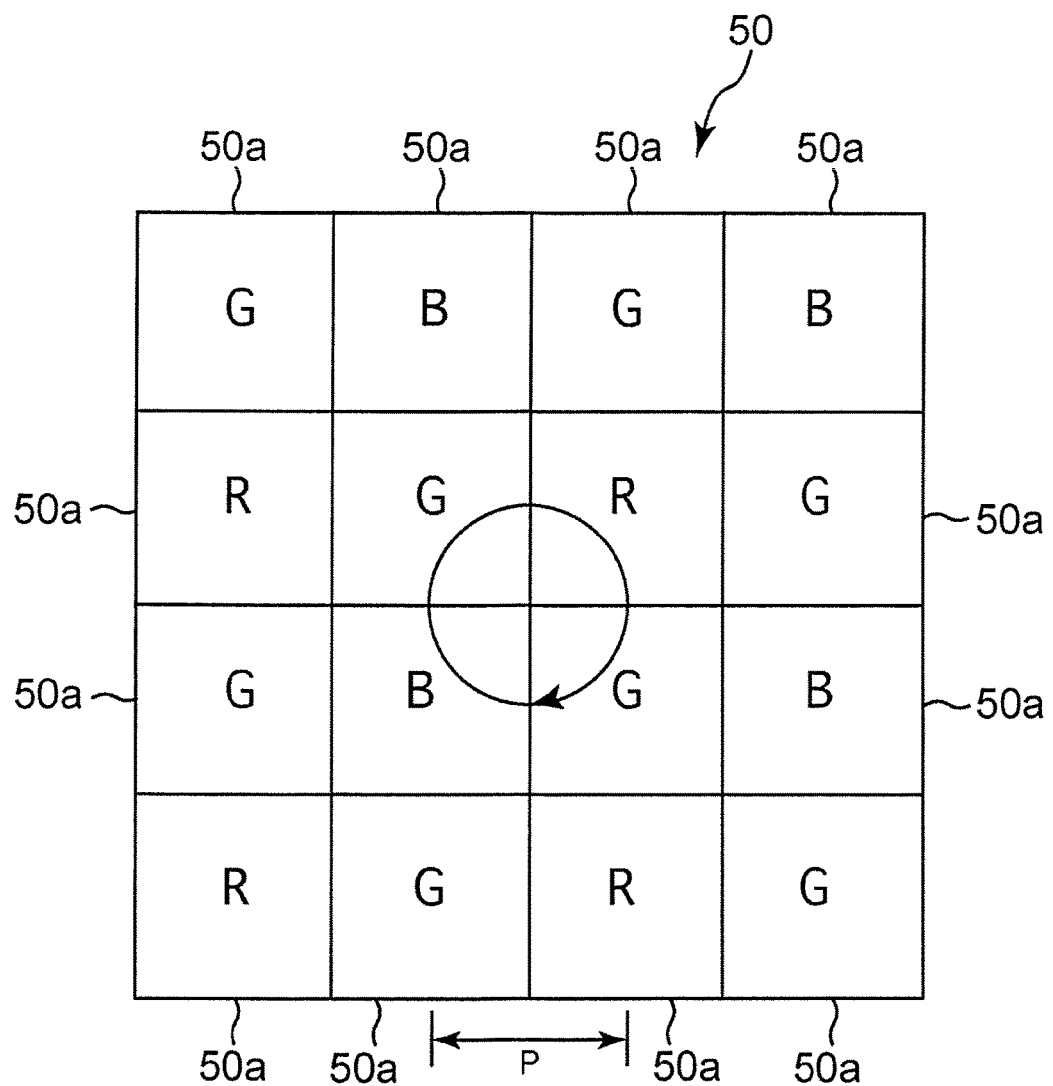
FIG. 4 is a diagram that indicates an optical low-pass filter effect that is provided by driving an image sensor to trace a rotationally symmetrical circular path about an optical axis of a photographing optical system.

The LPF operation for providing an LPF effect using the image sensor 50 via the image-shake correction device 70 by LPF driving the image sensor 50 in a circular path, which is rotationally symmetrical about the optical axis Z of the photographing optical system, will be hereinafter explained with reference to FIG. 4. In FIG. 4, the image sensor 50 is provided with a large number of pixels 50a arranged in a matrix form at a predetermined pixel pitch P on the light-receiving surface, and one color filter of color filters R, G and B, which are arranged in a Bayer array, is provided on a front surface of each pixel 50a. Each pixel 50a detects the color of the object light-rays that pass through one of the color filters R, G and B, on the front surface of the associated pixel 50a, and are incident thereon; namely, the color component (color zone) of the object light rays is photo-electrically converted and a charge corresponding to the strength (brightness) thereof is accumulated.

When the image sensor 50 is LPF driven, during an exposure, along a predetermined circular path, since the object light rays (light bundle) that are equally incident on the center of each color filter R, G, B and G (pixels 50a) are incident on the four color filters R, G, B and G, a similar effect to that of an optical low-pass filter can be obtained. In other words, since the light rays that are incident on any of the color filters R, G, B and G (pixels 50a) are always also incident on surrounding color filters R, G, B and G (pixels 50a), an effect (LPF effect) that is the same as if the light rays are passing through an optical low-pass filter can be obtained.

Furthermore, by switching in a stepwise manner the driving range of the image sensor 50, i.e., the radius of the circular path that the image sensor 50 traces, the magnitude of the LPF effect carried out of the image sensor 50 can be switched in a stepwise manner. The LPF effect can be made larger by increasing the radius of the circular path traced by the image sensor 50, and the LPF effect can be made smaller by reducing the radius of the circular path traced by the image sensor 50. As shown in Table 1, in the illustrated embodiment, the driving range of the image sensor 50 together with the LPF effect can be switched between three stages: "OFF", "TYPE 1 (Small)" and "TYPE 2 (Large)". The driving range of the image sensor 50 together with the LPF effect being "OFF" refers to the image sensor 50 not being LPF driven (however, image-shake correction driving may be performed), and hence refers to a state where no LPF effect can be obtained. Furthermore, in the present embodiment, when at "TYPE 1 (Small)", the radius of the circular path traced by the image sensor 50 is $\{\pi/(4*2^{1/2})\}P$, and when at "TYPE 2 (Large)", the radius of the circular path traced by the image sensor 50 is $(\pi/4)P$, with respect to a pixel pitch P of the image sensor 50.

TABLE 1

| Driving Range of Image Sensor 50 | OFF | TYPE 1 (Small) | TYPE 2 (Large) |
|---|---|---|---|
| LPF Effect via Image Sensor 50 | OFF | Small | Large |

Figure 6:
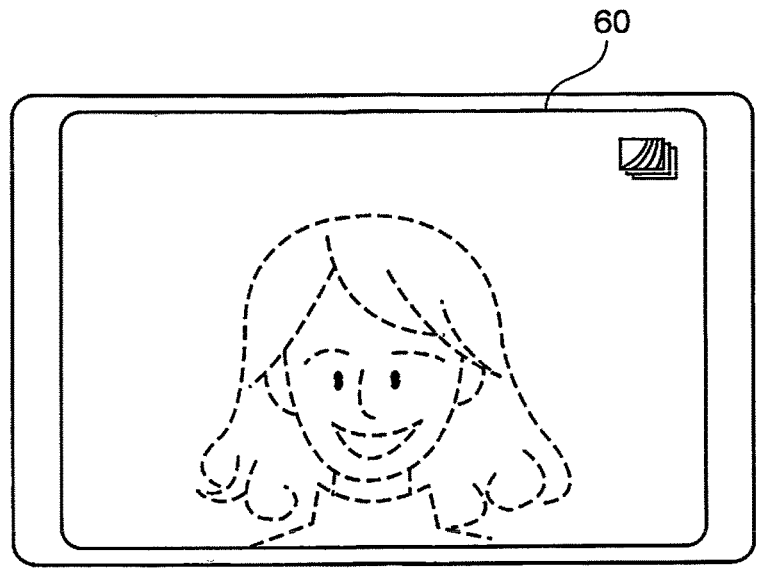
FIG. 6 is a diagram showing a control operation, when an enlarged photographed image displayed on the LCD is switched, of an enlarging and displaying of a corresponding common part of the photographed images before and after being switched.
Figure 6:
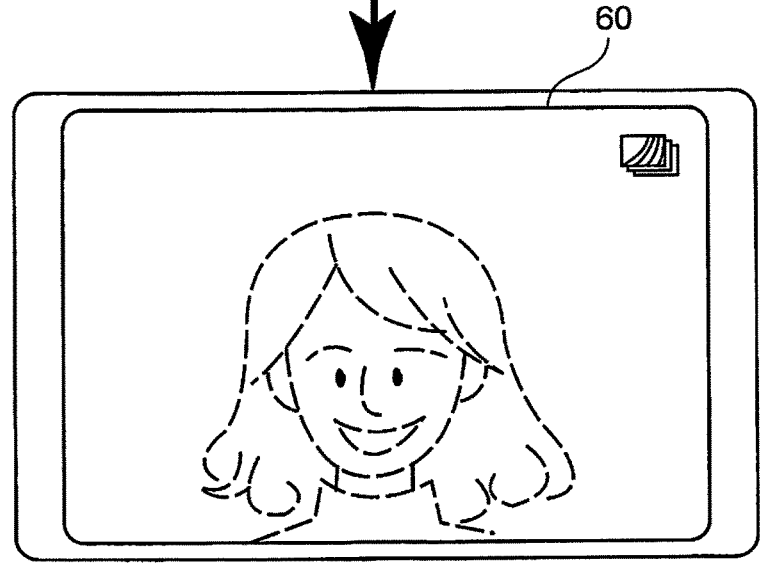
Figure 7:
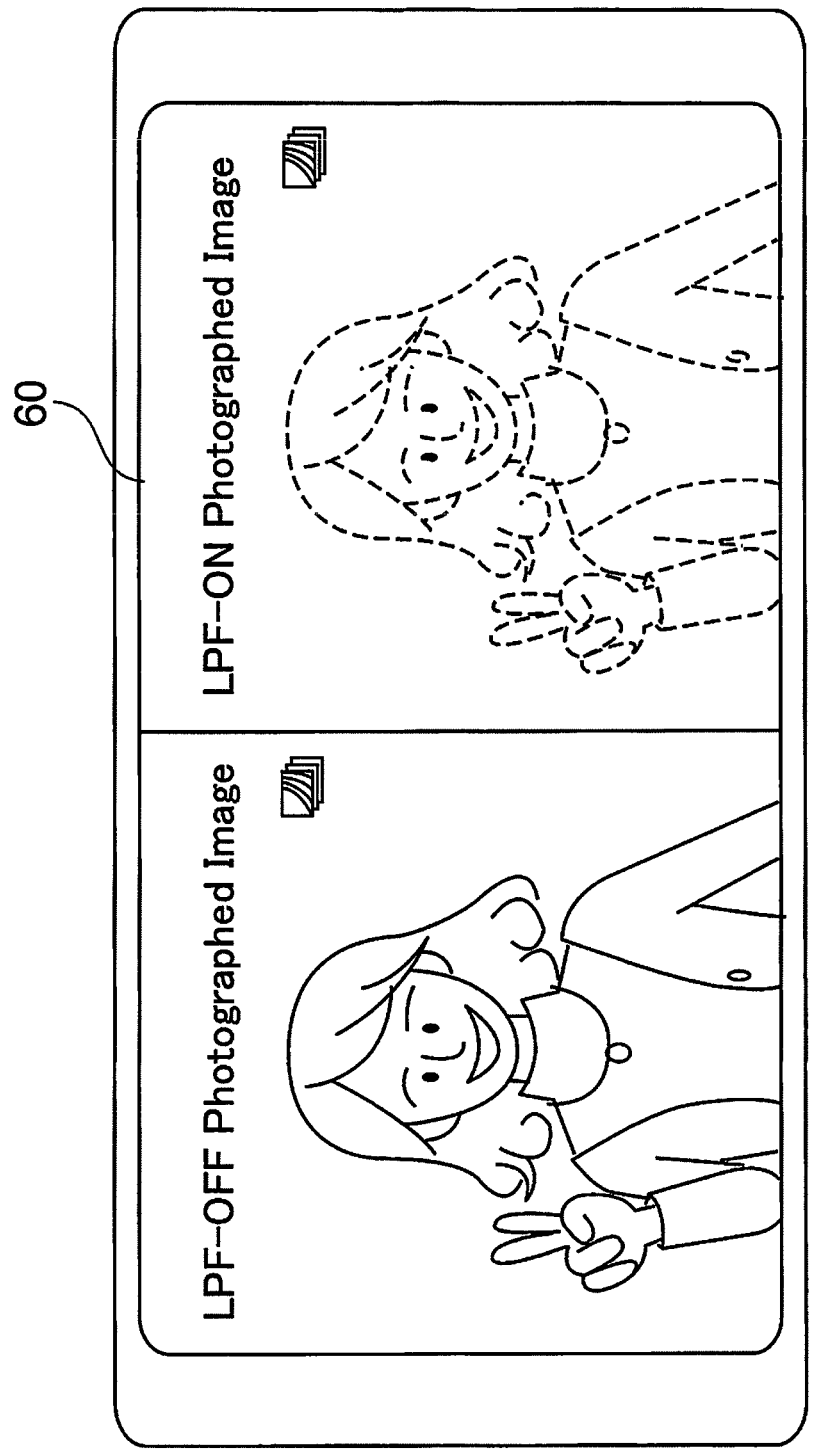
FIG. 7 is a diagram showing an LPF-ON photographed image and an LPF-OFF photographed image displayed on the LCD and arranged in a comparable manner.

The LCD 60 is provided on the rear side of the camera body 20. The LCD 60 performs a real-time display of a live view image in a live view mode (photographing standby mode), a playback display of a photographed image (still image, movie, and various other kinds of images), and a display for confirming and changing various settings of the digital camera 10. Furthermore, the LCD 60 displays confirmation and changes, etc., to the settings in regard to the low-pass selector, which is one of the photographing modes of the digital camera 10. Furthermore, the LCD 60 displays that low-pass selector photographing controller 110 performing a plurality of photographing operations (FIG. 6 & FIG. 7).

The rear side of the camera body 20 is provided with operational switches (second switch) 80 for confirming and changing, etc., various settings of the digital camera 10. Various settings such as the aperture value, shutter speed, ISO sensitivity, flash, and self-timer, etc., can be performed by operating the operational switches 80. Another photographing mode setting can be switched ON and OFF by operating the operational switches 80; this other photographing mode, as a photographing mode of the digital camera 10, includes at least one of a bulb shooting mode, continuous shooting mode, exposure bracketing mode, multiple exposure shooting mode, mirror-up shooting mode, auto-shooting mode (automatically determining scene recognition and exposure values), movie-shooting mode and live view mode. A shutter-release button 85, for performing a photographing operation by the digital camera 10, is provided on a top surface of the camera body 20.

Furthermore, it is possible to separately provide a mode dial (not shown), in addition to the operational switches 80, for setting the bulb shooting mode, auto-shooting mode and movie-shooting mode, etc., and for the remaining photographing modes to be set by the operational switches 80.

The operational switches 80 includes a low-pass selector operational switch (first switch) 82 for confirming and changing, etc., various settings of the low-pass selector, which is one of photographing modes of the digital camera 10. The low-pass selector operational switch 82 can be provided as a separate switch from the operational switches 80, or can be implemented as part of a function of the operational switches 80. The low-pass selector operational switch (first switch) and the operational switches (second switch) 80 can independently and separately set the photographing mode of the digital camera 10.

Figure 5:
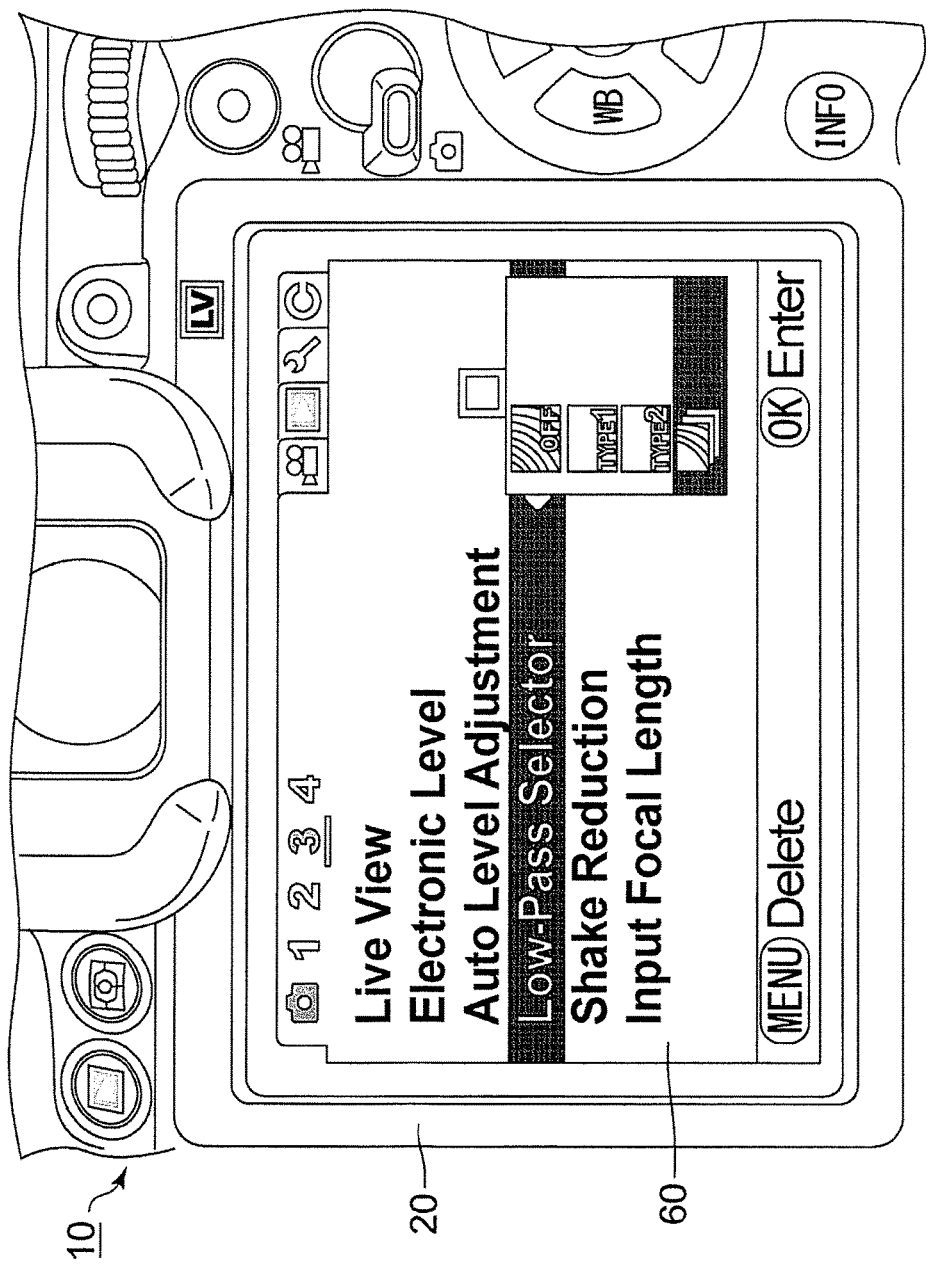
FIG. 5 is a view of the mode-selection screen of the low-pass selector that is displayed on the LCD.

The low-pass selector operational switch 82 can set the low-pass selector, which is one of the photographing modes of the digital camera 10, to one of "OFF", "TYPE 1", "TYPE 2" and "LPF Bracketing". FIG. 5 shows a mode-selection screen, displayed on the LCD 60, of the low-pass selector. In the example shown in FIG. 5, the icons "OFF", "TYPE 1", "TYPE 2" and "LPF Bracketing", which branch out from the item "Low-Pass Selector", are arranged in that order from top to bottom; one of these four icons can be selected and set by the low-pass selector operational switch 82.

The camera CPU 100 is provided with a low-pass selector photographing controller (processor) 110. The low-pass selector photographing controller 110 controls various components within the camera body 20 in order to carry out a photographing operation in accordance with the low-pass selector mode that is set by the low-pass selector operational switch 82. The photographing control by the low-pass selector photographing controller 110 can be performed by, e.g., being triggered by the photographer depressing the shutter-release button 85.

The low-pass selector photographing controller 110 sets the driving range of the image sensor 50 together with the LPF effect to "OFF", of Table 1, when the low-pass selector mode is set to "OFF", and LPF-OFF photography is performed, in which the image signal produced by the image sensor 50 is recorded (obtained) in a state where the image sensor 50 is not LPF-driven by the image-shake correction device 70, so that an optical low-pass filter effect is not obtained. However, an image-shake correction drive of the image sensor 50 may be carried out by the image-shake correction device 70.

The low-pass selector photographing controller 110 sets the driving range of the image sensor 50 together with the LPF effect to "TYPE 1 (Small)", of Table 1, when the low-pass selector mode is set to "TYPE 1 (Small)", and LPF-ON photography is performed, in which the image signal produced by the image sensor 50 is recorded (obtained) in a state where the image sensor 50 is LPF-driven by the image-shake correction device 70, so that an optical low-pass filter effect is obtained.

The low-pass selector photographing controller 110 sets the driving range of the image sensor 50 together with the LPF effect to "TYPE 2 (Large)", of Table 1, when the low-pass selector mode is set to "TYPE 2 (Large)", and LPF-ON photography is performed, in which the image signal produced by the image sensor 50 is recorded (obtained) in a state where the image sensor 50 is LPF-driven by the image-shake correction device 70, so that an optical low-pass filter effect is obtained.

The low-pass selector photographing controller 110 performs "LPF bracketing", which obtains three photographed images by performing the following three consecutive photographing operations when the low-pass selector mode is set to "LPF Bracketing".

In the first photographing operation, the low-pass selector photographing controller 110 sets the driving range of image sensor 50 together with the LPF effect to "OFF", of Table 1, and LPF-OFF photography is performed, in which the image signal produced by the image sensor 50 is recorded (obtained) in a state where the image sensor 50 is not LPF-driven by the image-shake correction device 70 so that an optical low-pass filter effect is not obtained. However, an image-shake correction drive of the image sensor 50 may be carried out by the image-shake correction device 70.

In the second photographing operation, the low-pass selector photographing controller 110 sets the driving range of the image sensor 50 together with the LPF effect to "TYPE 1 (Small)", of Table 1, and LPF-ON photography is performed, in which the image signal produced by the image sensor 50 is recorded (obtained) in a state where the image sensor 50 is LPF-driven by the image-shake correction device 70, so that an optical low-pass filter effect is obtained.

In the third photographing operation, the low-pass selector photographing controller 110 sets the driving range of the image sensor 50 together with the LPF effect to "TYPE 2 (Large)", of Table 1, and LPF-ON photography is performed, in which the image signal produced by the image sensor 50 is recorded (obtained) in a state where the image sensor 50 is LPF-driven by the image-shake correction device 70, so that an optical low-pass filter effect is obtained.

In this manner, the low-pass selector photographing controller 110 performs LPF-OFF photography in the first photographing operation, and thereafter, in the LPF-ON photography of the second and third photographing operations, performs two photographing operations by stepwise increasing the driving amount of the image sensor 50 and the optical low-pass filter effect.

The three photographed images obtained by the above-described "LPF bracketing" are displayed in the LCD 60 and are stored in the image memory 65.

In another embodiment, the low-pass selector photographing controller (processor) 110 can perform the first through third photographing operations in a reversed order to that described above.

In the first photographing operation, the low-pass selector photographing controller 110 sets the driving range of the image sensor 50 together with the LPF effect to "TYPE 2 (Large)", of Table 1, and LPF-ON photography is performed, in which the image signal produced by the image sensor 50 is recorded (obtained) in a state where the image sensor 50 is LPF-driven by the image-shake correction device 70, so that an optical low-pass filter effect is obtained.

In the second photographing operation, the low-pass selector photographing controller 110 sets the driving range of the image sensor 50 together with the LPF effect to "TYPE 1 (Small)", of Table 1, and LPF-ON photography is performed, in which the image signal produced by the image sensor 50 is recorded (obtained) in a state where the image sensor 50 is LPF-driven by the image-shake correction device 70, so that an optical low-pass filter effect is obtained.

In the third photographing operation, the low-pass selector photographing controller 110 sets the driving range of the image sensor 50 together with the LPF effect to "OFF", of Table 1, and LPF-OFF photography is performed, in which the image signal produced by the image sensor 50 is recorded (obtained) in a state where the image sensor 50 is not LPF-driven by the image-shake correction device 70 so that an optical low-pass filter effect is not obtained. However, an image-shake correction drive of the image sensor 50 may be carried out by the image-shake correction device 70.

In this manner, the low-pass selector photographing controller 110, in the LPF-ON photography of the first and second photographing operations, can perform two photographing operations by stepwise decreasing the driving amount of the image sensor 50 and the optical low-pass filter effect, and thereafter can perform LPF-OFF photography in the third photographing operation.

The three photographed images obtained by the above-described "LPF bracketing" are displayed in the LCD 60 and are stored in the image memory 65.

The camera CPU 100 is provided with a display controller (magnified-display controller/comparative display controller) 120. The display controller 120 controls the displaying, on the LCD 60, of the LPF-ON photographed image obtained by LPF-ON photography and/or the LPF-OFF photographed image obtained by LPF-OFF photography.

The display controller (magnified-display controller) 120 has a function which enlarges and displays part of the LPF-ON photographed image and/or the LPF-OFF photographed image on the LCD 60.

When the LPF-ON photographed image and/or the LPF-OFF photographed image are/is enlarged and displayed on the LCD 60, the display controller (magnified-display controller) 120 can forcibly cause the LPF-ON photographed image and/or the LPF-OFF photographed image to be displayed at a 1:1 ratio.

Alternatively, in the case where the LPF-ON photographed image and/or the LPF-OFF photographed image are/is enlarged and displayed on the LCD 60, if the LPF-ON photographed image and/or the LPF-OFF photographed image are/is not displayed at a 1:1 ratio, the display controller 120 can display an alert on the LCD (alerter) 60 such as, e.g., "Moire and False Color cannot be Correctly Confirmed unless Displayed at 1:1 Ratio", to prompt the user. In addition, a similar alert can be generated by an audio sound from a speaker (alerter), not shown in the drawings. Alternatively, a similar alert can be generated by emitting light from an LED or by vibration. In the present embodiment, since an anti-shake operation is carried out by driving a lens element constituting part of the photographing lens group 32 or the image sensor 50 in directions orthogonal to the optical axis, if the anti-shake unit is made to jiggle or collide against a drive extremity to produce a vibration, the number of components would not increase.

Incidentally, the reason why it cannot be accurately confirmed whether moire and/or false color exist if the LPF-ON photographed image and/or the LPF-OFF photographed image are/is not displayed at a 1:1 ratio is due to the following. Namely, in the case of a reduced display, the pixels would be thinned out when displayed, so that the occurrence of moire and false color would change or not be displayed at all. Whereas, if the LPF-ON photographed image and/or the LPF-OFF photographed image are/is displayed at a 1:1 ratio, it is possible for the photographer to accurately determine the occurrence of moire and false color.

Hence, the LPF-ON photographed image and/or the LPF-OFF photographed image can be displayed on the LCD 60 at a 1:1 ratio by the photographer operating an operational button, the photographer can accurately discern the occurrence of moire and false color with the LPF-ON photographed image displayed at a 1:1 ratio, and can accurately confirm the result of the removal of moire and false color with the LPF-ON photographed image displayed at a 1:1 ratio.

The display controller (magnified-display controller) 120 can forcibly display the LPF-ON photographed image at a 1:1 ratio when the LPF-ON photographed image is enlarged and displayed on the LCD 60, and when the LPF-OFF photographed image is enlarged and displayed on the LCD 60, the LPF-OFF photographed image can be enlarged and displayed while varying the enlargement ratio without limiting the LPF-OFF photographed image to being displayed at a 1:1 ratio.

As shown in FIG. 6, when the photographed image that is enlarged and displayed on the LCD 60 is switched to another photographed image, the display controller (magnified-display controller) 120 enlarges and displays the same part corresponding to each photographed image before and after the photographed images are switched. The switching of the photographed images includes, e.g., the switching between an LPF-ON photographed image in which the LPF operation is "TYPE 1 (Small)" and an LPF-ON photographed image in which the LPF operation is "TYPE 2 (Large)", and the switching between an LPF-OFF photographed image in the LPF operation is "OFF" and an LPF-ON photographed image in which the LPF operation is "TYPE 1 (Small)" or "TYPE 2 (Large)"; FIG. 6 shows the former thereof.

Accordingly, when the photographer enlarges and visually compares a plurality of images obtained by LPF bracketing, the confirmation of the removal state of moire and false color is facilitated.

As shown in FIG. 7, the display controller (comparative display controller) 120 can display the LPF-ON photographed image obtained by LPF-ON photography and the LPF-OFF photographed image obtained by LPF-OFF photography on the LCD 60 to be arranged in a comparable manner. Accordingly, the photographer can visually compare a photographed image having maximally improved resolution and contrast (LPF-OFF photographed image) simultaneously with a photographed image which prevents occurrence of moire and false color (LPF-ON photographed image). Note that although FIG. 7 shows a display of two photographed images arranged in a comparable manner, it is possible to display three or more photographed imaged arranged in a comparable manner.

Figure 8:
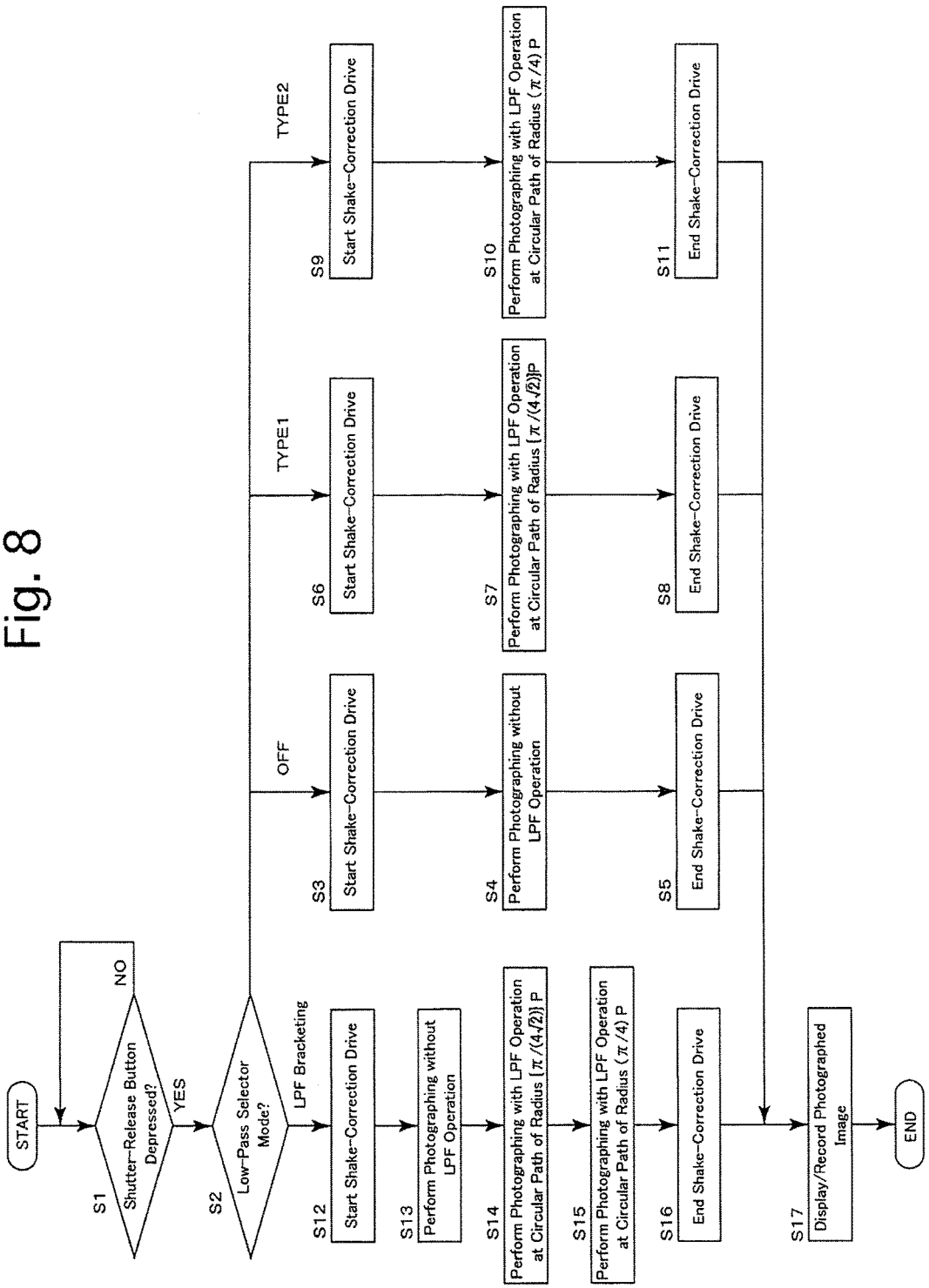
FIG. 8 is a flowchart showing a first operation (photographing method) of the digital camera, according to the present invention.

A first operation (photographing method) of the digital camera 10 of the present invention will be herein discussed with reference to FIG. 8. In the example shown in FIG. 8, the low-pass selector mode is set to one of "OFF", "TYPE 1", "TYPE 2" or "LPF Bracketing".

In the case where the low-pass selector mode is set to "OFF", upon the shutter-release button 85 being depressed (step S1: YES; step S2: "OFF"), the low-pass selector photographing controller 110 holds the image sensor 50 at a central position and commences a shake-correction drive operation (step S3), performs LPF-OFF photography without performing an LPF operation (step S4), holds the image sensor 50 at the central position and ends the shake-correction drive operation (step S5). The single photographed image that was taken at step S4 is displayed on the LCD 60 and stored in the image memory 65 (step S17).

In the case where the low-pass selector mode is set to "TYPE 1", upon the shutter-release button 85 being depressed (step S1: YES; step S2: "TYPE 1"), the low-pass selector photographing controller 110 holds the image sensor 50 at a central position and commences a shake-correction drive operation (step S6), performs LPF-ON photography to obtain an LPF effect by LPF driving the image sensor 50 to trace a circular path having a radius $\{\pi/(4*2^{1/2})\}P$ (step S7), holds the image sensor 50 at the central position and ends the shake-correction drive operation (step S8). The single photographed image that was taken at step S7 is displayed on the LCD 60 and stored in the image memory 65 (step S17).

In the case where the low-pass selector mode is set to "TYPE 2", upon the shutter-release button 85 being depressed (step S1: YES; step S2: "TYPE 2"), the low-pass selector photographing controller 110 holds the image sensor 50 at a central position and commences a shake-correction drive operation (step S9), performs LPF-ON photography to obtain an LPF effect by LPF driving the image sensor 50 to trace a circular path having a radius $(\pi/4)P$ (step S10), holds the image sensor 50 at the central position and ends the shake-correction drive operation (step S11). The single photographed image that was taken at step S10 is displayed on the LCD 60 and stored in the image memory 65 (step S17).

In the case where the low-pass selector mode is set to "LPF Bracketing", upon the shutter-release button 85 being depressed (step S1: YES; step S2: "LPF Bracketing"), the low-pass selector photographing controller 110 holds the image sensor 50 at a central position and commences a shake-correction drive operation (step S12), performs LPF-OFF photography without performing an LPF operation (step S13), performs LPF-ON photography to obtain an LPF effect by LPF driving the image sensor 50 to trace a circular path having a radius $\{\pi/(4*2^{1/2})\}P$ (step S14), performs LPF-ON photography to obtain an LPF effect by LPF driving the image sensor 50 to trace a circular path having a radius (π/4)P (step S15), holds the image sensor 50 at the central position and ends the shake-correction drive operation (step S16). The three photographed images that were taken at steps S13, S14 and S15 are displayed on the LCD 60 and are stored in the image memory 65 (step S17).

Figure 9:
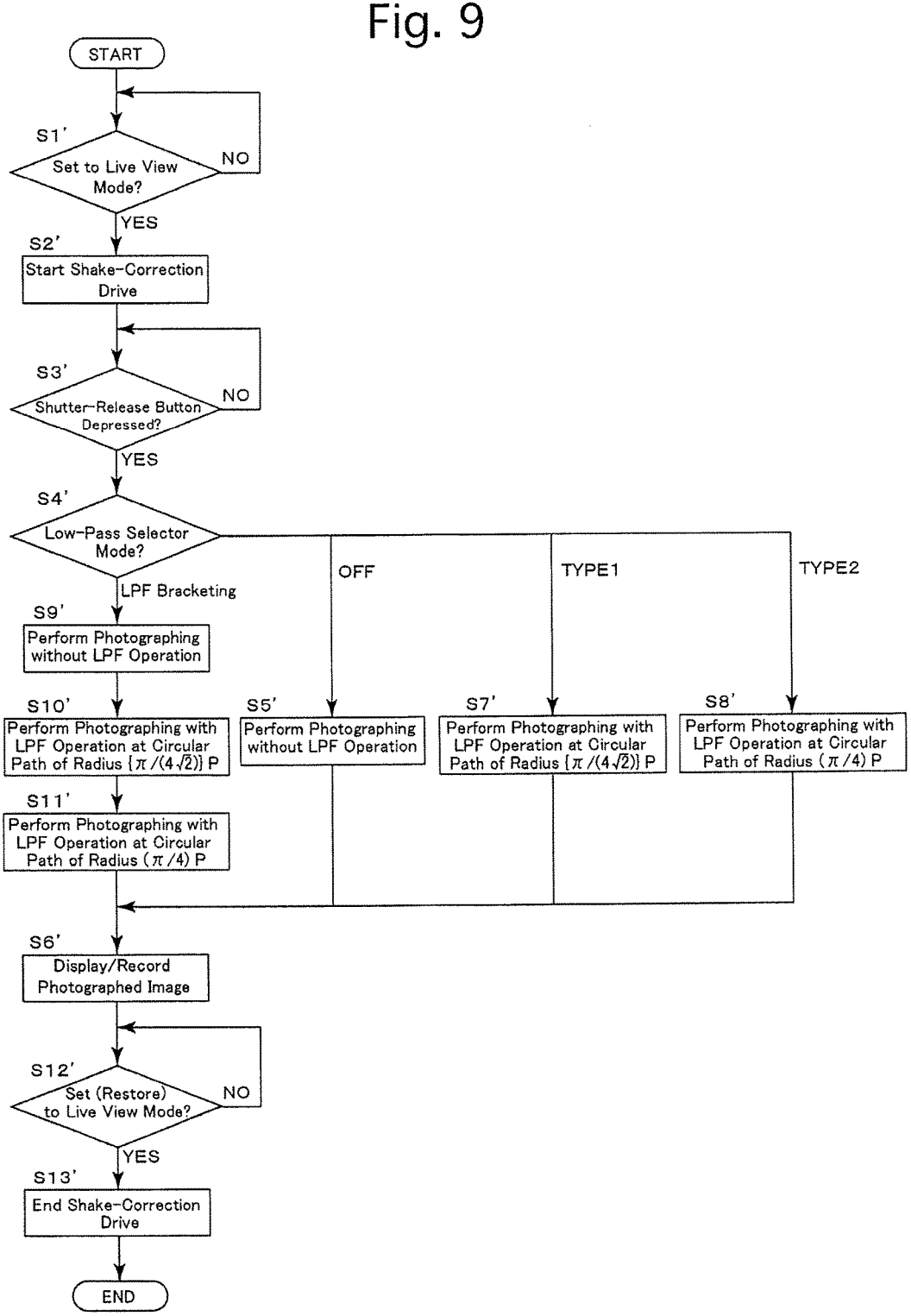
FIG. 9 is a flowchart showing a second operation (photographing method) of the digital camera, according to the present invention.

A second operation (photographing method) of the digital camera 10 of the present invention will be herein discussed with reference to FIG. 9. The example shown in FIG. 9 shows the case where the shutter-release button 85 has been depressed during the live view mode (photographing standby mode).

In the case where the digital camera 10 is set to the live view mode (photographing standby mode) (step S1': YES), the low-pass selector photographing controller 110 holds the image sensor 50 at a central position and commences a shake-correction drive operation (step S2'). During the live view mode, the image-shake correction device 70 only performs a shake-correction drive operation of the image sensor 50 and does not perform an LPF drive operation.

Upon the shutter-release button 85 being depressed during the live view mode (step S3': YES), the setting of the live view mode is released, and the low-pass selector photographing controller 110 performs a photographing operation in accordance with the low-pass selector mode (step S4': "OFF", "TYPE 1", "TYPE 2" or "LPF Bracketing").

If the shutter-release button 85 is depressed in the case where the low-pass selector mode is set to "OFF" (step S3': YES; step S4': "OFF"), the low-pass selector photographing controller 110 performs an LPF-OFF photographing operation in which an LPF operation is not carried out and the image-shake correction device 70 only performs an image-shake correction drive operation without performing an LPF operation (step S5'). The single photographed image that was taken at step S5' is displayed on the LCD 60 and stored in the image memory 65 (step S6').

If the shutter-release button 85 is depressed in the case where the low-pass selector mode is set to "TYPE 1" (step S3': YES; step S4': "TYPE 1"), the low-pass selector photographing controller 110 performs the LPF-ON photographing operation via the image-shake correction device 70 to obtain an LPF effect by LPF driving the image sensor 50 to trace a circular path having a radius $\{\pi/(4*2^{1/2})\}$P while performing an image-shake correction drive operation (step S7'). The single photographed image that was taken at step S7' is displayed on the LCD 60 and stored in the image memory 65 (step S6').

If the shutter-release button 85 is depressed in the case where the low-pass selector mode is set to "TYPE 2" (step S3': YES; step S4': "TYPE 2"), the low-pass selector photographing controller 110 performs the LPF-ON photographing operation via the image-shake correction device 70 to obtain an LPF effect by LPF driving the image sensor 50 to trace a circular path having a radius (π/4)P while performing an image-shake correction drive operation (step S8'). The single photographed image that was taken at step S8' is displayed on the LCD 60 and stored in the image memory 65 (step S6').

If the shutter-release button 85 is depressed in the case where the low-pass selector mode is set to "LPF Bracketing" (step S3': YES; step S4': "LPF Bracketing"), the low-pass selector photographing controller 110 performs an LPF-OFF photographing operation in which an LPF operation is not carried out and the image-shake correction device 70 only performs an image-shake correction drive operation without performing an LPF operation (step S9'), performs the LPF-ON photographing operation via the image-shake correction device 70 to obtain an LPF effect by LPF driving the image sensor 50 to trace a circular path having a radius $\{\pi/(4*2^{1/2})\}$P while performing an image-shake correction drive operation (step S10'), and performs the LPF-ON photographing operation via the image-shake correction device 70 to obtain an LPF effect by LPF driving the image sensor 50 to trace a circular path having a radius (π/4)P while performing an image-shake correction drive operation (step S11'). The three photographed images that were taken at steps S9', S10' and S11' are displayed on the LCD 60 and are stored in the image memory 65 (step S6').

Upon the photographing operation via the low-pass selector completing and the digital camera 10 setting (returning to) the live view mode (step S12': YES), the image sensor 50 is held at the central position and the shake-correction drive operation ends (step S13').

Figure 10:
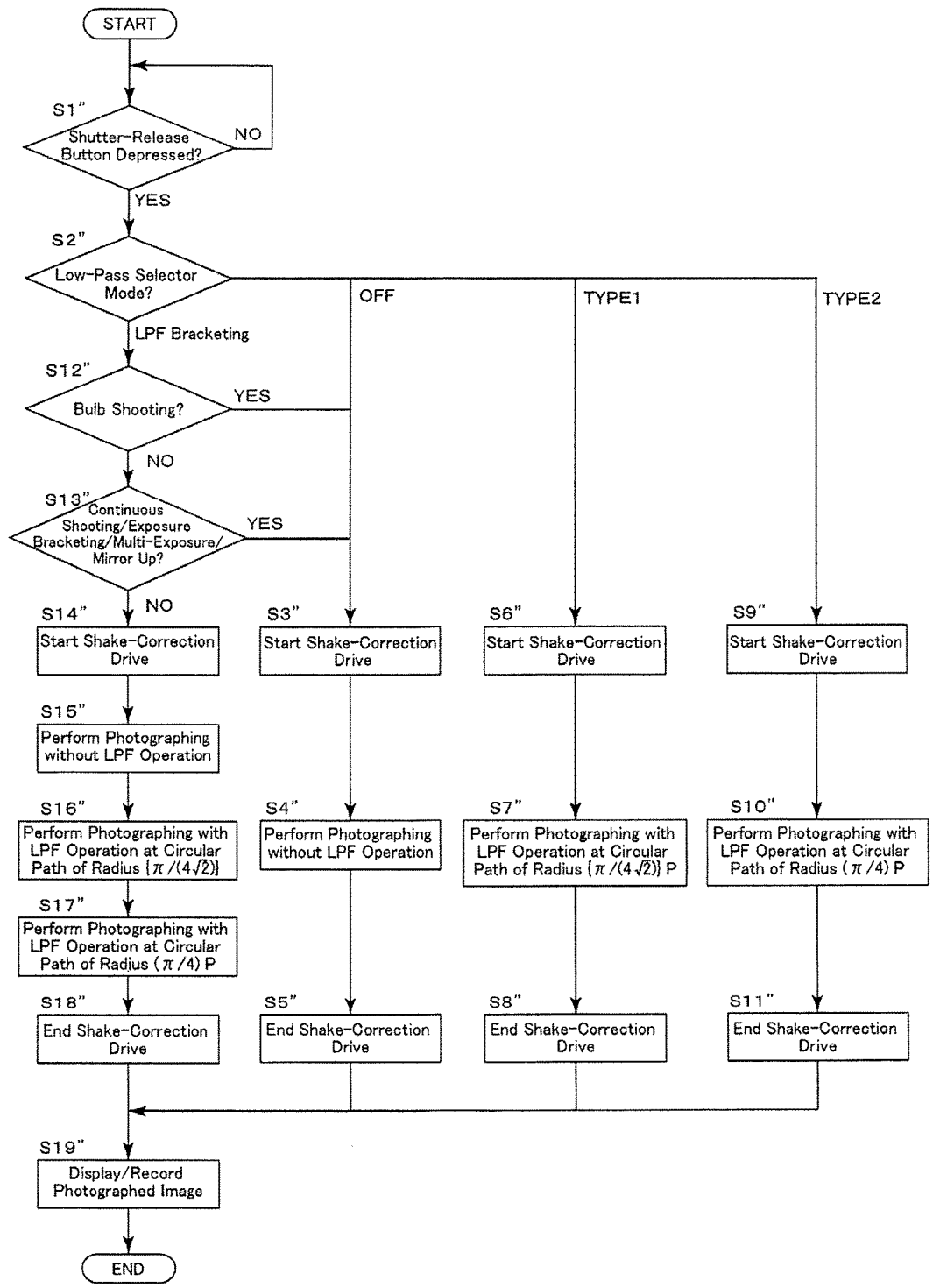
FIG. 10 is a flowchart showing a third operation (photographing method) of the digital camera, according to the present invention.

A third operation (photographing method) of the digital camera 10 of the present invention will be herein discussed with reference to FIG. 10. The example shown in FIG. 10 shows the case where the low-pass selector operational switch (first switch) 82 and the operational switches (second switch) 80 independently and separately set the photographing mode of the digital camera 10.

In the case where the low-pass selector mode is set to "OFF", upon the shutter-release button 85 being depressed (step S1": YES; step S2": "OFF"), the low-pass selector photographing controller 110 holds the image sensor 50 at the central position and commences a shake-correction drive operation (step S3"), performs LPF-OFF photography without performing an LPF operation (step S4"), holds the image sensor 50 at the central position and ends the shake-correction drive operation (step S5"). The single photographed image that was taken at step S4" is displayed on the LCD 60 and stored in the image memory 65 (step S19").

In the case where the low-pass selector mode is set to "TYPE 1", upon the shutter-release button 85 being depressed (step S1": YES; step S2": "TYPE 1"), the low-pass selector photographing controller 110 holds the image sensor 50 at the central position and commences a shake-correction drive operation (step S6"), performs LPF-ON photography to obtain an LPF effect by LPF driving the image sensor 50 to trace a circular path having a radius $\{\pi/(4*2^{1/2})\}$P (step S7"), holds the image sensor 50 at the central position and ends the shake-correction drive operation (step S8"). The single photographed image that was taken at step S7" is displayed on the LCD 60 and stored in the image memory 65 (step S19").

In the case where the low-pass selector mode is set to "TYPE 2", upon the shutter-release button 85 being depressed (step S1": YES; step S2": "TYPE 2"), the low-pass selector photographing controller 110 holds the image sensor 50 at a central position and commences a shake-correction drive operation (step S9"), performs LPF-ON photography to obtain an LPF effect by LPF driving the image sensor 50 to trace a circular path having a radius (π/4)P (step S10"), holds the image sensor 50 at the central position and ends the shake-correction drive operation (step S11"). The single photographed image that was taken at step S10" is displayed on the LCD 60 and stored in the image memory 65 (step S19").

In the case where the low-pass selector mode is set to "LPF Bracketing", upon the shutter-release button 85 being depressed (step S1": YES; step S2": "LPF Bracketing"), the low-pass selector photographing controller 110 determines whether one of the bulb shooting mode, continuous shooting mode, exposure bracketing mode, multiple exposure shooting mode and mirror-up shooting mode has been set by the operational switches (second switch) 80 as the photographing mode of the digital camera 10 (step S12"; step S13").

If, as a result of the determination result, one of the bulb shooting mode, continuous shooting mode, exposure bracketing mode, multiple exposure shooting mode and mirror-up shooting mode has been set by the operational switches (second switch) 80 (step S12": YES; step S13": YES), the low-pass selector photographing controller 110 prioritizes the photographing mode that has been set by the operational switches (second switch) 80. Furthermore, the low-pass selector photographing controller 110 forcibly sets the low-pass selector to "OFF", and performs a photographing operation in the photographing mode that was set by the operational switches (second switch) 80 insteps S3", S4", S5" and S19".

If, as a result of the determination result, neither of the bulb shooting mode, continuous shooting mode, exposure bracketing mode, multiple exposure shooting mode nor mirror-up shooting mode has been set by the operational switches (second switch) 80 (step S12": NO; step S13": NO), the low-pass selector photographing controller 110 performs LPF bracketing. Namely, the low-pass selector photographing controller 110 holds the image sensor 50 at a central position and commences a shake-correction drive operation (step S14"), performs LPF-OFF photography without performing an LPF operation (step S15"), performs LPF-ON photography to obtain an LPF effect by LPF driving the image sensor 50 to trace a circular path having a radius $\{\pi/(4*2^{1/2})\}P$ (step S16"), performs LPF-ON photography to obtain an LPF effect by LPF driving the image sensor 50 to trace a circular path having a radius $(\pi/4)P$ (step S17"), holds the image sensor 50 at the central position and ends the shake-correction drive operation (step S18"). The three photographed images that were taken at steps S15", S16" and S17" are displayed on the LCD 60 and are stored in the image memory 65 (step S19").

In the flowchart of FIG. 10, when the "LPF bracketing photographing mode" has been set by the low-pass selector operational switch (first switch) 82 while one of the bulb shooting mode, continuous shooting mode, exposure bracketing mode, multiple exposure shooting mode and mirror-up shooting mode has been set by the operational switches (second switch) 80, priority is given to the photographing mode that has been set by the operational switches (second switch) 80.

However, an embodiment is possible in which, in the same circumstances, the "LPF bracketing photographing mode" that has been set by the low-pass selector operational switch (first switch) 82 is given priority. In such an embodiment, the photographing mode setting by the operational switches (second switch) 80 can either be refused or made invalid. The operations of the digital camera 10 in such an embodiment are the same as those shown in the flowcharts of FIG. 8 and FIG. 9.

Hence, in the present embodiment, the low-pass selector photographing controller 110 performs a plurality of photographing operations, including performing LPF-ON photography in which an LPF drive operation of the image sensor (movable member/image-shake correction member) 50 via the image-shake correction device (driver) 70 is performed to thereby obtain an image signal from the image sensor 50 in a state where an optical low-pass filter effect has been obtained, and performing LPF-OFF photography in which an LPF drive operation of the image sensor (movable member/image-shake correction member) 50 via the image-shake correction device (driver) 70 is not performed to thereby obtain an image signal from the image sensor 50 in a state where an optical low-pass filter effect has not been obtained. Accordingly, a photographic image having maximally improved resolution and contrast while, at the same time, being able to achieve a photographic image which prevents occurrence of moire and false color, and can be applied in a versatile manner with respect to the photographer's photographic preferences can be achieved without the use of an expensive optical low-pass filter.

In the above-described embodiment, an example is described in which the image sensor 50 is LPF driven in a plane that is orthogonal to the optical axis, with the image sensor 50 acting as a "movable member/shake-correction member"; however, the present invention is not limited thereto. For example, it is possible for a lens element constituting part of the photographing lens group (photographing optical system) 32 to serve as a "movable member/shake-correction member", in which this lens element (optical element) is LPF driven in a plane that is orthogonal to the optical axis by a voice coil motor (driver) provided within the interchangeable photographing lens 30. Alternatively, it is possible for both the image sensor 50 and a lens element constituting part of the photographing lens group (photographing optical system) 32 to serve as a "movable member/shake-correction member", which is LPF driven in a plane that is orthogonal to the optical axis. In either configuration, image shake can be corrected by displacing the imaging position of an object image on the image sensor 50, while obtaining an optical low-pass filter effect with the object light bundle incident on a plurality of pixels, having different detection colors, of the image sensor 50.

Although in the above-described embodiment an example is given in which the image sensor (movable member/shake correction member) 50 is driven, via the image-shake correction device (driver) 70, in a plane that is orthogonal to the optical axis in order to carry out an image-shake correction operation and an LPF operation, the direction in which the image sensor 50 is to be driven is not limited to such a direction, so long as the direction is different to that of the optical axis of the photographing optical system.

Although in the above-described embodiment an example is given in which the predetermined path traced by the image sensor 50 is a circular path that is rotationally symmetrical about the optical axis Z of the photographing optical system, the predetermined path is not limited thereto. For example, a square path that is rotationally symmetrical about the optical axis Z of the photographing optical system or a reciprocal linear-movement path on a plane that is orthogonal to the optical axis Z of the photographing optical system are also acceptable.

Furthermore, the image sensor 50 can be driven (by micro-vibrations), on a plane orthogonal to the optical axis Z of the photographing lens system, in one of a horizontal direction and a vertical direction, or both directions thereof. Accordingly, for example, with respect to an object having a portion that has a high spatial frequency in only one direction out of the horizontal direction and the vertical direction, an image can be obtained in which deterioration of resolution can be maximally suppressed while reducing moire and false color. Furthermore, the amount (strength) of the driving (micro-vibration) of the image sensor 50 can be individually set for each direction. Accordingly, a moire and/or false color removal effect can be individually set for each direction, thereby obtaining an image at the closer to what is intended by the photographer.

Although in the above-described embodiment an example is given in which the image-shake correction device (driver) 70 is configured by the magnets M1, M2 and M3 and the yokes Y1, Y2 and Y3 being mounted onto the mount support plate 71, and the drive coils C1, C2 and C3 being mounted onto the mount support plate 71, the positional relationship thereof can be reversed by mounting the magnets and the yokes onto the movable stage and mounting the drive coils onto the mount support plate.

Although in the above-described embodiment an example is given in which the body 20 and the interchangeable photographing lens 30 are detachably attached to each other (lens interchangeable), a configuration is possible in which the body 20 and the interchangeable photographing lens 30 are not detachably attached (non lens-interchangeable).

In the above-described embodiment an example is given in which the photographing apparatus of the present invention is applied to the digital SLR camera 10 provided with the movable mirror (quick-return mirror) 40. However, the photographing apparatus of the present invention can likewise also be applied to a so-called mirrorless digital camera, in which a movable mirror (quick-return mirror) is omitted.

Although in the above-described embodiment an example is given in which the driving range of the image sensor 50 together with the LPF effect can be switched between the three stages: "OFF", "TYPE 1 (Small)" and "TYPE 2 (Large)", it possible to set the driving range of the image sensor 50 together with the LPF effect more broadly or more finely. For example, a configuration in which the driving range of the image sensor 50 together with the LPF effect is switched between two stages such as "OFF" and "ON", or a configuration in which the driving range of the image sensor 50 together with the LPF effect is switched between seven stages such as "OFF", "TYPE 1", "TYPE 2", "TYPE 3", "TYPE 4", "TYPE 5" and "TYPE 6" (the larger the number the greater the driving range of the image sensor 50 together with the LPF effect) is possible.

In the above-described embodiment, an example is given in which, during LPF-ON photography, a plurality of photographing operations are performed while increasing or decreasing the optical low-path filter effect in stages. However, during LPF-ON photography, the optical low-pass filter effect does not need to be increased or decreased in stages while a plurality of photographs are taken, it is only necessary for the optical low-pass filter effect to be changed in stages while a plurality of photographs are taken.

In the above-described embodiment, when the low-pass selector mode is set at "LPF bracketing", if the shutter-release button 85 is depressed once, "LPF bracketing" is performed to thereby obtain three photographed images; however, the present invention is not limited thereto. For example, an embodiment is possible in which, with the low-pass selector mode set to "LPF bracketing", "LPF bracketing" is continuously performed while the shutter-release button 85 is being held down. In such an embodiment, the longer the period of time the shutter-release button 85 is held down, the greater the number of photographed imaged that are obtained by the "LPF bracketing" operation, and the shorter the period of time the shutter-release button 85 is held down, the fewer the number of photographed imaged that are obtained by the "LPF bracketing" operation.

It is possible to integrate conventional "exposure bracketing" with the "LPF bracketing" of the present invention. For example, by integrating the exposure bracketing which changes the exposure amount in three stages, "±0", "+1" and "−1", with two stages "OFF" and "TYPE 1" of the LPF operation, the following six (kinds) of photographed images can be obtained in a single operation:

Exposure amount "±0" in the LPF operation "OFF"
Exposure amount "±0" in the LPF operation "TYPE 1"
Exposure amount "+1" in the LPF operation "OFF"
Exposure amount "+1" in the LPF operation "TYPE 1"
Exposure amount "−1" in the LPF operation "OFF"
Exposure amount "−1" in the LPF operation "TYPE 1"

Furthermore, by integrating the exposure bracketing which changes the exposure amount in three stages, "±0", "+1" and "−1", with three stages "OFF", "TYPE 1" and "TYPE 2" of the LPF operation, the following nine (kinds) of photographed images can be obtained in a single operation:

Exposure amount "±0" in the LPF operation "OFF"
Exposure amount "±0" in the LPF operation "TYPE 1"
Exposure amount "±0" in the LPF operation "TYPE 2"
Exposure amount "+1" in the LPF operation "OFF"
Exposure amount "+1" in the LPF operation "TYPE 1"
Exposure amount "+1" in the LPF operation "TYPE 2"
Exposure amount "−1" in the LPF operation "OFF"
Exposure amount "−1" in the LPF operation "TYPE 1"
Exposure amount "−1" in the LPF operation "TYPE 2"

INDUSTRIAL APPLICABILITY

It is desirable for the photographing apparatus, the photographing method and the program according to the present invention to be used in a photographing apparatus, a photographing method and a program of a digital camera, etc.

REFERENCE SIGNS LIST

10 Digital SLR camera (photographing apparatus)
20 Camera body
30 Interchangeable photographing lens
32 Photographing lens group (photographing optical system/movable member/shake-correction member)
34 Lens CPU
40 Movable mirror (quick-return mirror)
40X Rotational pivot
41 Pentaprism
42 Eyepiece lens element
43 Mirror driver
45 Shutter
46 Shutter driver
50 Image sensor (movable member/shake-correction member)
50a Pixels
R G B Color filters
51 Image-sensor drive controller
60 LCD (display/alerter)
65 Image memory
70 Image-shake correction device (driver)
71 Mount support plate
72 Movable stage
73 Shake-correction drive controller (drive-signal generator)
M1 M2 M3 Magnets
Y1 Y2 Y3 Yokes
C1 C2 C3 Drive coils
H1 H2 H3 Hall sensors
80 Operational switches (second switch)
82 Low-pass selector operational switch (first switch)
85 Shutter-release button
100 Camera CPU
110 Low-pass selector photographing controller (bracketing device processor)
120 Display controller (magnified-display controller/comparative display controller)

The invention claimed is:

1. A photographing apparatus comprising:
an image sensor, which converts an object image that is formed by a photographing optical system into electrical image signals;
a magnetic driver configured to obtain an optical low-pass filter effect without an optical low-pass filter, via an object light-bundle being incident on a plurality of pixels of said image sensor, by LPF driving a movable member in a direction that is different from an optical axis direction of said photographing optical system, wherein said movable member includes at least one of a lens element, constituting part of said photographing optical system, and said image sensor; and
a processor configured to perform a plurality of photographing operations including an LPF-ON photographing operation, which obtains an image signal from said image sensor when said movable member has been LPF driven by the magnetic driver and obtains an optical low-pass filter effect without an optical low-pass filter, and an LPF-OFF photographing operation, which obtains an image signal from said image sensor when said movable member has not been LPF driven by the magnetic driver and does not obtain an optical low-pass filter effect.

2. The photographing apparatus according to claim 1, wherein, during said LPF-ON photographing operation, said processor performs a plurality of photographing operations by LPF driving said movable member by said magnetic driver in stages by different driving amounts to thereby obtain different optical low-pass filter effects in stages.

3. The photographing apparatus according to claim 2, wherein said processor first performs the LPF-OFF photographing operation, and thereafter, in the LPF-ON photographing operation, performs a plurality of photographing operations while increasing the optical low-pass filter effect in stages.

4. The photographing apparatus according to claim 2, wherein, in the LPF-ON photographing operation, said processor first performs a plurality of photographing operations while decreasing the optical low-pass filter effect in stages, and thereafter performs the LPF-OFF photographing operation.

5. The photographing apparatus according to claim 1, further comprising a magnified-display controller which enlarges and displays part of an LPF-ON photographed image of said LPF-ON photographing operation on a display,
wherein, when said LPF-ON photographed image is enlarged and displayed on said display, said magnified-display controller forcibly displays said LPF-ON photographed image at a 1:1 ratio.

6. The photographing apparatus according to claim 1, further comprising a magnified-display controller which enlarges and displays part of an LPF-OFF photographed image of said LPF-OFF photographing operation on a display,
wherein, when said LPF-OFF photographed image is enlarged and displayed on said display, said magnified-display controller forcibly displays said LPF-OFF photographed image at a 1:1 ratio.

7. The photographing apparatus according to claim 1, further comprising:
a magnified-display controller which enlarges and displays part of an LPF-ON photographed image of said LPF-ON photographing operation on a display; and
an alerter which outputs a warning when said LPF-ON photographed image is not displayed at a 1:1 ratio when said magnified-display controller has enlarged and displayed said LPF-ON photographed image on said display.

8. The photographing apparatus according to claim 1, further comprising:
a magnified-display controller which enlarges and displays part of an LPF-OFF photographed image of said LPF-OFF photographing operation on a display; and
an alerter which outputs a warning when said LPF-OFF photographed image is not displayed at a 1:1 ratio when said magnified-display controller has enlarged and displayed said LPF-OFF photographed image on said display.

9. The photographing apparatus according to claim 1, further comprising a magnified-display controller which enlarges and displays part of an LPF-ON photographed image of said LPF-ON photographing operation or part of an LPF-OFF photographed image of said LPF-OFF photographing operation on a display,
wherein, when one of said LPF-ON photographed image and said LPF-OFF photographed image that is enlarged and displayed on said display is switched to the other of said LPF-ON photographed image and said LPF-OFF photographed image, said magnified-display controller enlarges and displays a same part corresponding to each of said LPF-ON photographed image and said LPF-OFF photographed image before and after being switched.

10. The photographing apparatus according to claim 1, further comprising a magnified-display controller which enlarges and displays part of an LPF-ON photographed image of said LPF-ON photographing operation or part of an LPF-OFF photographed image of said LPF-OFF photographing operation on a display,
wherein, when said LPF-ON photographed image is enlarged and displayed on said display, said magnified-display controller forcibly displays said LPF-ON photographed image at a 1:1 ratio, and
wherein, when said LPF-OFF photographed image is enlarged and displayed on said display, said magnified-display controller enlarges and displays said LPF-OFF photographed image without limiting the LPF-OFF photographed image to be displayed at a 1:1 ratio.

11. The photographing apparatus according to claim 1, further comprising a magnified-display controller which enlarges and displays part of at least one of an LPF-ON photographed image of said LPF-ON photographing operation and an LPF-OFF photographed image of said LPF-OFF photographing operation on a display,
wherein, when said at least one of said LPF-ON photographed image and said LPF-OFF photographed image is enlarged and displayed on said display, said magnified-display controller forcibly displays said at least one of said LPF-ON photographed image and said LPF-OFF photographed image at a 1:1 ratio.

12. The photographing apparatus according to claim 1, further comprising a comparative display controller configured to display an LPF-ON photographed image obtained in said LPF-ON photographing operation and an LPF-OFF photographed image obtained in said LPF-OFF photographing operation on said display to be arranged in a comparable manner.

13. The photographing apparatus according to claim 1, wherein said magnetic driver is configured to perform image-shake correction by displacing an image position of the object image on said image sensor by performing an image-shake correction drive operation on said movable member in a direction different than a direction of the optical axis of said photographing optical system as a combined driving operation with that of said LPF driving or as an independent driving operation when said LPF driving is not being performed.

14. The photographing apparatus according to claim 13, wherein said photographing apparatus can be set to a live view mode or a movie-shooting mode, and
   wherein said magnetic driver is configured to only perform said image-shake correction drive operation on said movable member without performing said LPF driving during a period when said photographing apparatus is set to said live view mode or said movie-shooting mode.

15. The photographing apparatus according to claim 1, wherein said photographing apparatus further comprises:
   a first switch configured to switch ON and OFF a setting of an LPF bracketing mode; and
   a second switch configured to switch ON and OFF a setting of another photograph mode including at least one of a bulb shooting mode, continuous shooting mode, exposure bracketing mode, multiple exposure shooting mode, mirror-up shooting mode, auto-shooting mode, movie-shooting mode and live view mode,
   wherein, when both of said LPF bracketing mode and said another photographing mode are set ON by said first switch and said second switch, said photographing apparatus prioritizes said LPF bracketing mode that is set by said first switch.

16. The photographing apparatus according to claim 1, wherein said photographing apparatus further comprises:
   a first switch configured to switch ON and OFF a setting of an LPF bracketing mode; and
   a second switch configured to switch ON and OFF a setting of another photograph mode including at least one of a bulb shooting mode, continuous shooting mode, exposure bracketing mode, multiple exposure shooting mode, mirror-up shooting mode, auto-shooting mode, movie-shooting mode and live view mode,
   wherein, when both of said LPF bracketing mode and said another photographing mode are set ON by said first switch and said second switch, said photographing apparatus prioritizes said another photographing mode that is set by said second switch.

17. The photographing apparatus according to claim 1, wherein, when a shutter-release button is depressed once, said processor performs a plurality of photographing operations including an LPF-ON photographing operation and an LPF-OFF photographing operation, or, said processor performs a plurality of photographing operations including an LPF-ON photographing operation and an LPF-OFF photographing operation only when said shutter-release button is held down.

18. The photographing apparatus according to claim 1, wherein said photographing apparatus further comprises:
   a display configured to display an indication that said processor performs a plurality of photographing operations.

19. A photographing method of a photographing apparatus, which includes an image sensor, which converts an object image that is formed by a photographing optical system into electrical pixel signals; and a magnetic driver configured to obtain an optical low-pass filter effect without an optical low-pass filter, via an object light-bundle being incident on a plurality of pixels of said image sensor, by driving a movable member in a direction that is different from an optical axis of direction said photographing optical system, wherein said movable member includes at least one of a lens element, constituting part of said photographing optical system, and said image sensor, said photographing method comprising:
   bracketing, by performing a plurality of photographing operations including an LPF-ON photographing operation, which obtains an image signal from said image sensor when said movable member has been LPF driven by the magnetic driver and obtains an optical low-pass filter effect without an optical low-pass filter, and an LPF-OFF photographing operation, which obtains an image signal from said image sensor when said movable member has not been LPF driven by driver and does not obtain an optical low-pass filter effect.

* * * * *